No. 864,473. PATENTED AUG. 27, 1907.
G. D. KRIEBEL.
QUILTING FRAME.
APPLICATION FILED MAR. 1, 1907.
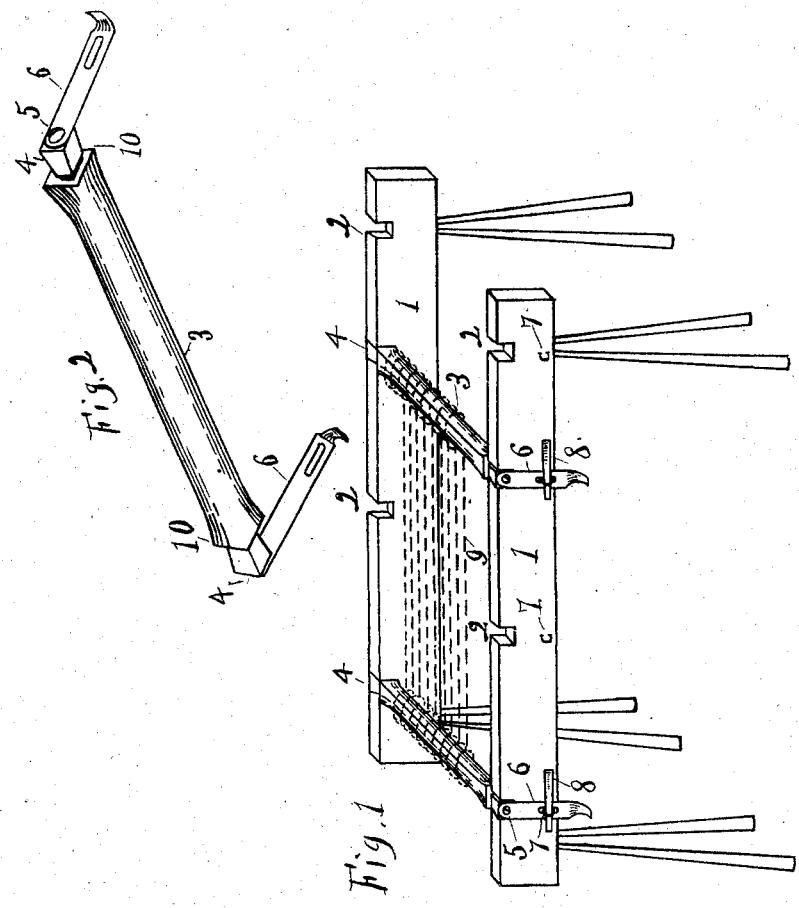
WITNESSES:
Silas S. Brown.
Edwin C. Mitchell.
George D. Kriebel INVENTOR.
BY
W. Stewart Brown ATTORNEY.

UNITED STATES PATENT OFFICE.

GEORGE D. KRIEBEL, OF WICHITA, KANSAS.

QUILTING-FRAME.

No. 864,473.　　　　Specification of Letters Patent.　　　　Patented Aug. 27, 1907.

Application filed March 1, 1907. Serial No. 360,110.

*To all whom it may concern:*

Be it known that I, GEORGE D. KRIEBEL, a resident of Wichita, in the county of Sedgwick and State of Kansas, have invented certain new and useful Improvements in Quilting-Frames; and I do hereby declare the following to be a full, clear, and exact description of the invention, such as will enable others skilled in the art to which it appertains to make and use the same.

My invention relates to quilting frames and has for its object the production of a cheap and durable frame, easy of adjustment and other novel features which will be hereinafter described, illustrated in the accompanying drawings and succinctly defined in the appended claims.

Figure 1, is a perspective view of my invention. Fig. 2, is a roller with hasps attached.

Reference being had to the drawings, 1, designates a pair of suitable horses which are provided with a plurality of indents 2, to receive dovetailed tenons on the rollers 3. The body portions of said rollers are round, the free ends terminating with square shoulders 10 and quadrangular dovetailed tenons. It will be seen when these rollers and horses are assembled as seen in Fig. 1, the horses will not spread apart. To the ends of the tenons 4, are pivotally secured by screws 5, hasps 6, which engage with staples 7, driven into the horses and are held in engagement by keys 8. The dotted lines 9, indicate a quilt wrapped around the rollers. When it is desired to roll the quilt up one roller can be lifted out of engagement with the horses, the quilt then rolled up, and the tenons dropped into other indents and secured therein by hasp 6 and staple 7, as shown.

Having described my invention, what I claim and wish to secure by United States Letters Patent is:

In a quilting frame, a pair of horses, each having a plurality of indents in its upper edge, rollers mounted in said indents, said rollers having round body portions, square shoulders and dovetailed tenons, hasps pivotally secured to the tenons, staples on the horses arranged to register with the hasps, and keys to hold said hasps in engagement, with the staples, as set forth.

In testimony whereof, I have signed this specification in the presence of two subscribing witnesses.

GEORGE D. KRIEBEL.

Witnesses:
 SILAS S. BROWN,
 EDWIN C. MITCHELL.